Patented Nov. 8, 1938

2,135,863

UNITED STATES PATENT OFFICE 2,135,863

AIR FILTER

Russell S. Walker, Duluth, Minn., assignor of one-half to Warren S. Moore, Duluth, Minn.

Application July 9, 1937, Serial No. 152,731

5 Claims. (Cl. 183—71)

My present invention relates to air filters for ventilating systems or apparatus such as employed in factories, stores, dwellings and the like; and, generally stated, the invention consists of the novel devices, combinations of devices and arrangement of parts hereinafter described and defined in the claims.

As a filtering media in such filtering units it is the common practice to use sheets of cotton batting and to hold the same in manifold formation by manifold perforated or reticulate forming sheets frequently made of wire but sometimes of other materials. The common fault of these forming sheets has been that when an attempt is made to get high efficiency by the use of closely positioned folds, the forming sheets will permit the filtering sheet under air pressure to be pressed together and a large part of the filtering surface thereby blanked or blocked out of use.

My present invention eliminates disadvantages of the earlier structures and provides an extremely simple and highly efficient air filtering unit. A highly important and novel feature of the invention is in the construction and arrangement of the element that holds in shape the sheet of flexible filtering media, and which element, because of its character and the function it performs, is herein designated as a manifold lattice. This lattice may be made of various different materials, but in all cases it is important that this lattice be of low cost production.

In practice this lattice will usually be made of a screened, molded, pressed or otherwise formed paper or wool pulp material. In some cases this lattice and the filtering media, which is usually a sheet of cotton batting, will be treated with a well known chemicals to render both either fire-resistant or fireproof; but in other instances both the filtering sheet and the lattice will be left in natural condition so that they can be burned up, if desired, after use thereof.

In both of the above instances the manifold lattice will be of low cost material and may be discarded and disposed of after the first use thereof. The bars of the lattice are made concavo-convex in cross section for several reasons, to wit: to give increased strength thereto against lateral bending; to get a minimum of actual contact between the filtering sheet and the lattice bars, thereby rendering negligible the amount of filtering surface blanked out of use by the lattice bars; to facilitate and simplify the periodic changes and replacing of the filtering sheets and lattice. Another important advantage derived from the channel-shaped or concavo-convex ribs is the provision of a lattice or forming device which may have large air passages and which at the same time will be self-sustaining and strong enough to give proper form to the very flexible filtering sheet. Also this manifold lattice is especially adapted by and is preferably combined with a holding frame of such character that replacements of the filtering media and lattice are made an easy matter.

A filtering unit usually consists of a holding frame, a filtering sheet and a manifold lattice. In practice I have found it desirable to provide a frame of permanent nature, so that it can be used over and over again, and to make the filtering and the skeleton former sheet of cheap or low cost materials. That object, of course, has been accomplished by the use of cotton batting as a filtering sheet. It has also been proposed to make the former sheet of paper or wood pulp, which material is also combustible. In the preferred form of the present invention the skeleton filtering sheet is, as above indicated, made from pulp.

The above noted features and other novel and important features will appear in the description of the commercial form of the invention illustrated in the accompanying drawings, wherein like characters indicate like parts throughout the several views.

Referring to the drawings.

Figure 1:
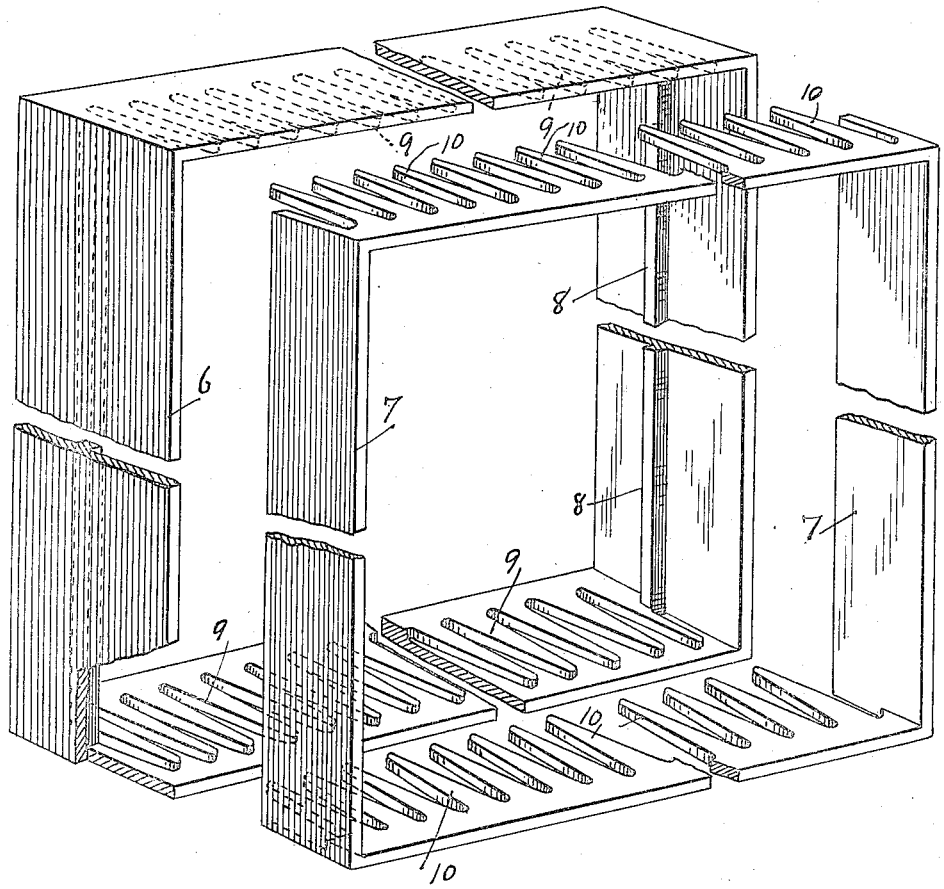
Fig. 1 is a perspective with some parts broken away showing the two-part holding frame of the filtering unit, the sections of said frame being drawn apart.
Figure 2:
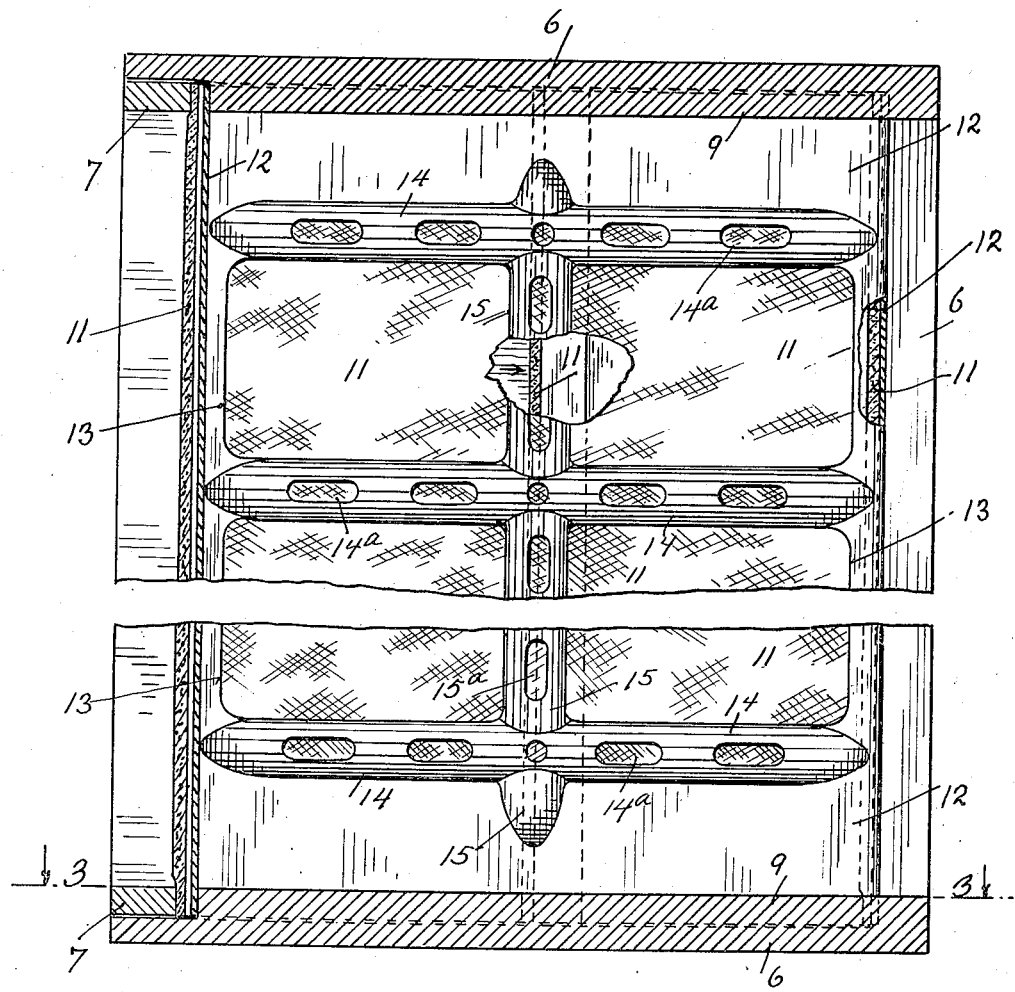
Fig. 2 is a transverse vertical section taken through the complete filtering unit on the line 2—2 of Fig. 4, some parts being broken away.
Figure 3:
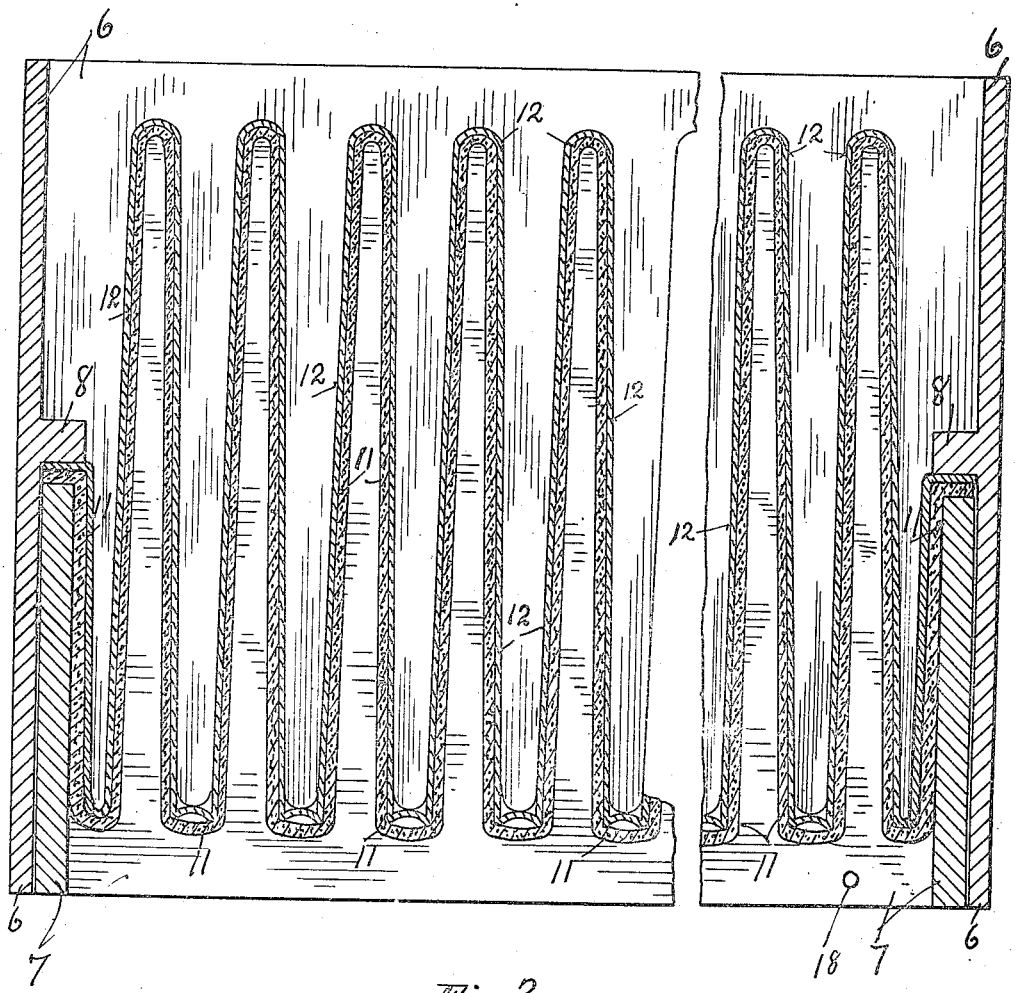
Fig. 3 is a horizontal section taken through the filtering unit on the line 3—3 of Fig. 5, some parts being broken away.

The holding frame, which may be made of wood or any other suitable rigid material, is made up of two rectangular sections, to wit: an outer rectangular frame or section 6 and an inner rectangular frame or section 7. The outer frame 6 on the inner surface of its vertical sides is provided with inwardly projecting outwardly-extending clamping shoulders 8 in the form of instanding cleats. On the under surface of its top and the upper surface of its bottom plates the outer frame is formed with tapered cone-like wedge ribs 9. The upper and lower bars of the inner frame 7 are formed with wedge-acting teeth or ribs 10 that are adapted to be nested between the wedge-acting ribs 9 when the frame 7 is forced into the frame 6. Here it should also be noted that the inner edges of the vertical plates of the inner frame 7 will be forced against or between the shoulders or ribs 8 when the frames are assembled. As will presently appear, these two frames are adapted to clamp and hold both the filtering sheet and the skeleton former sheet pressed together in manifold arrangement corresponding to the formation of the interlapped wedge-acting members 9 and 10.

The filtering sheet 11, which, as before stated, is preferably a sheet of cotton batting, is held in the manifold form shown in the drawings by the skeleton lattice, which latter is indicated as an entirety by the numeral 12. This lattice 12 is provided with large openings 13 located between horizontal ribs 14 and vertical ribs 15. These ribs 14 and 15 are concavo-convex or channel shaped in cross section. In the drawings these ribs are shown as semi-cylindrical in cross section, but in some instances may be V-shaped; but in either event they will be arranged so that the filtering sheet 11 will engage only with the narrow edges of the said ribs, whereby the filtering sheet is held against movements into complete contact with the interiors of the said ribs under air pressure. The horizontal ribs 14 are deeper than the vertical ribs 15, so that when the complete filler made up of the filtering sheet and forming sheet is placed within the frame, the relatively deep horizontal ribs 14 of adjacent folds will come into contact, thereby limiting the closing movements of the folds, but the vertical ribs 15 will be out of contact, thereby leaving the air passages for the free movement of air between the folds except, of course, as the air passes through the filtering sheet.

Figure 5:
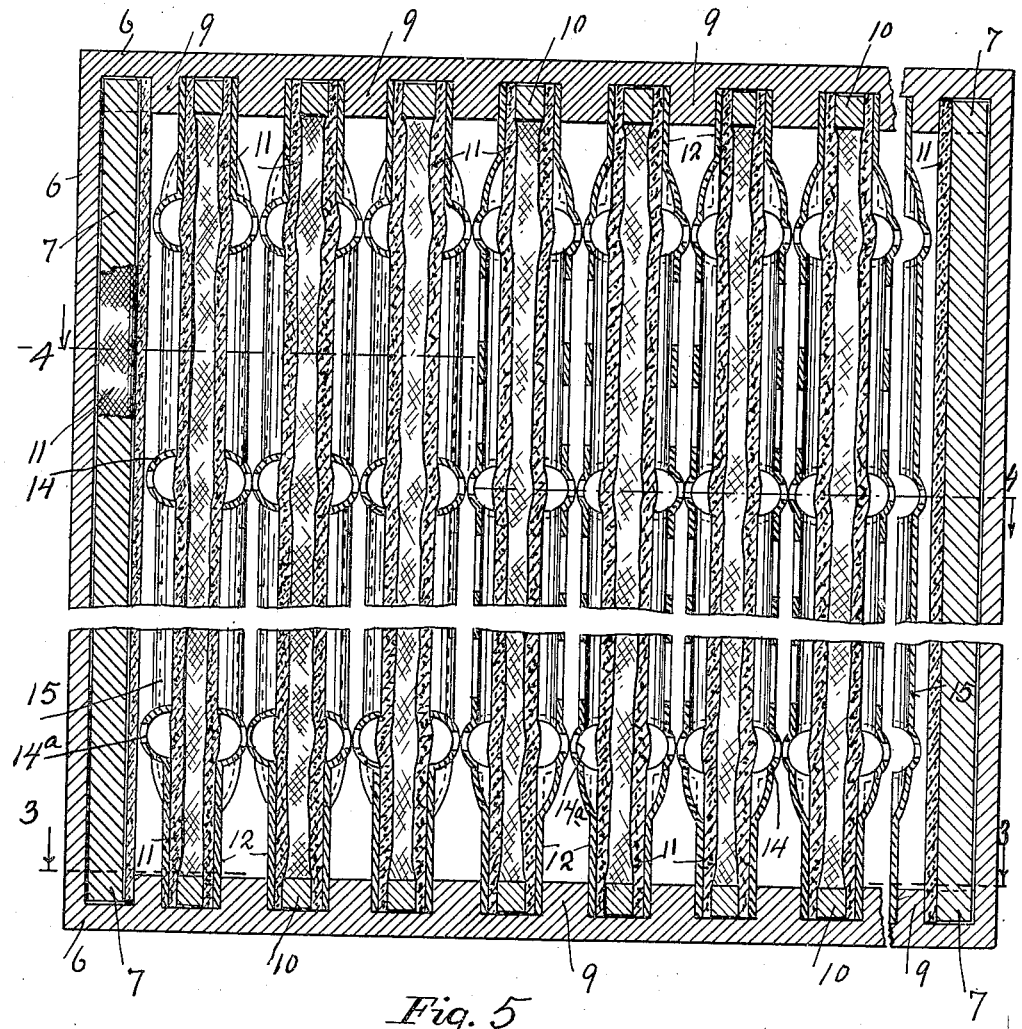
Fig. 5 is a vertical section taken on the irregular line 5—5 of Fig. 4, some parts being broken away.

By reference particularly to Fig. 5 it will be noted that the major portions of the filtering sheet which span the large openings 13 of the forming sheet will, by the edges of the ribs 14 and 15, be held so that the filtering sheet will not be bulged through the said openings and pressed together, but will be kept separated, and, hence, practically all of the surface of the filtering sheet will be rendered operative for the collection of dust from air forced through the filtering material. Even those portions of the filtering sheet that span the channels of the ribs will be kept operative, and for that reason the said ribs 14 and 15 are shown respectively as provided with air passages 14a and 15a.

Figure 4:
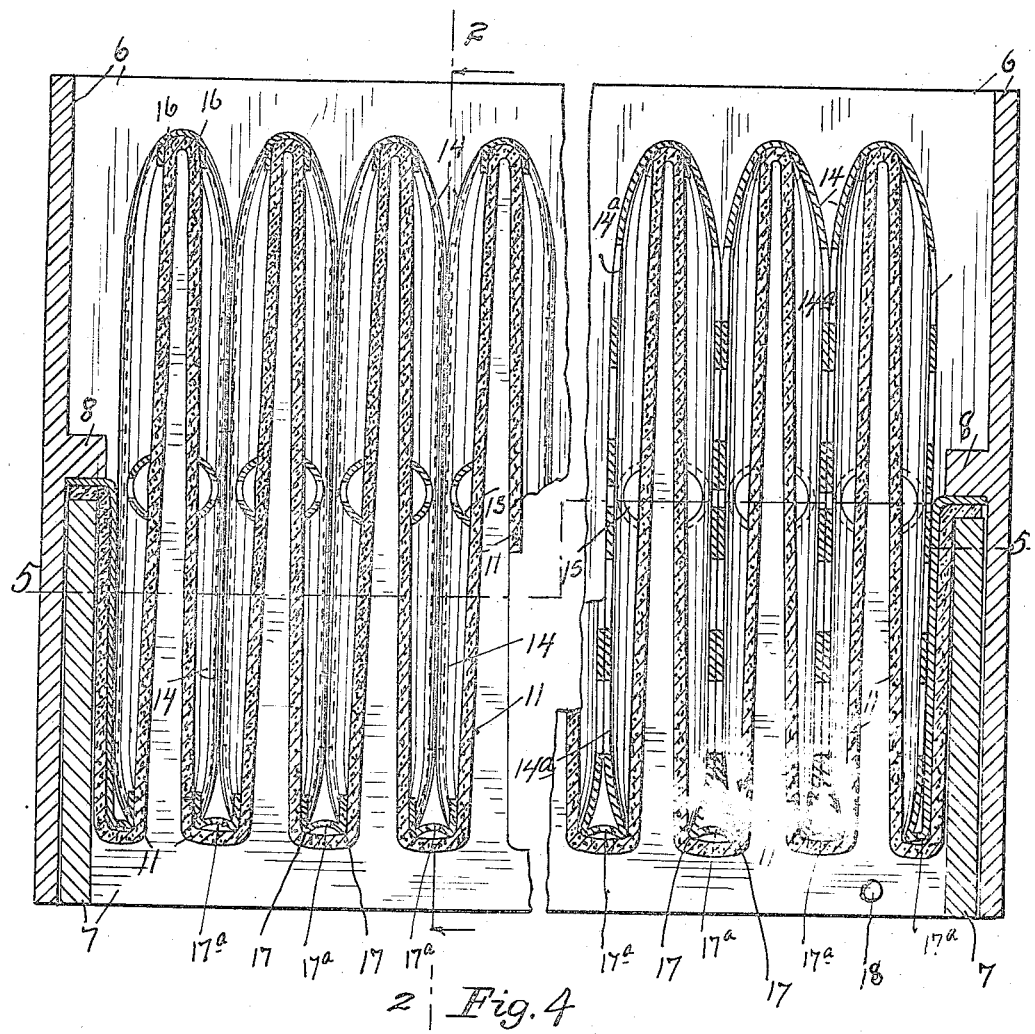
Fig 4 is a horizontal section taken through the filtering unit on the irregular line 4—4 of Fig. 5.

The manifold lattice is creased or provided with kerfs that adapt them to fold on the lines marked 16 and 17 on Fig. 4, so that the said lattice, (which is quite rigid and self-sustaining in form, except at these folding places) will naturally take the manifold formation, thereby giving to the filtering sheet the same desirable manifold formation.

When the lattice or skeleton sheet and the filtering material have been assembled in manifold condition, they will readily slip into the outer frame 6 with the upper and lower edges of the said filtering sheet and forming sheet within the spaces between the wedge-acting ribs 9; then when the inner frame is slipped into position, the upper and lower edges of the said sheets will be clamped tight between the wedge-acting portions 9 and 10, and the vertical edges of the sheets will be tightly clamped between the vertical ribs or shoulders 8 of the outer frame and the inner vertical edges of the inner frame 7. Any suitable means may be employed for securing the two frames 6 and 7 together when assembled as above described.

It is important to note that the vertical ribs at the pressure side of the device formed between the kerfed or bending lines 16—17 are concave, so that the filtering sheet does not become seated therein. To render these extreme front portions of the filtering sheet operative these concave vertical ribs are preferably formed with perforations at 17a.

Obviously when the parts are assembled as shown in all of the views except Fig. 1, no air can pass through the holding frame without passing through the filtering sheet or media. The construction described makes feasible very deep folds in the filtering media and very close assembling of the folds, and this, of course, gives a maximum amount of filtering surface within, a holding frame of any definite or determined size.

As one means for locking the frame sections 6 and 7 together pins or bolts may be passed therethrough, as indicated at 18.

The ease with which the forming and filtering sheets may be assembled for application in the frame is obvious from the foregoing statements. When the filtering sheets have become overloaded, they and the combustible former sheets will be removed and may be burned up or otherwise destroyed. Both of the above elements are of low cost, and in practice it has been found that the above manner of applying, using, removing, destroying and replacing these elements is a very economical method of maintenance.

For the purpose of shipment the described structure is also highly efficient. When the latticed sheets are spread out flat, they may be nestled together and a large number thereof contained within a relatively small and compact space. Also it is perfectly feasible and desirable to pack and ship the flattened-out latticed sheets and the filtering sheets alternated and nestled together, so that when a latticed sheet is picked up it will carry with it the filtering sheet, and the two together can be collapsed into their manifold form ready for application into the holding frame.

A preferred form of the device has been illustrated in the drawings, but it will be understood that various modifications can be made within the scope of the invention herein disclosed and claimed.

In the drawings the manifold filler is shown with the ridges extending vertically, but it will, of course, be understood that the device may be set with the ridges running horizontally; hence, the description of the said parts as vertically arranged in the specification and in certain of the claims is not intended as a limitation as to the exact setting of the device.

What I claim is:

1. A filler for air filters involving a skeleton former having vertical and horizontally extended concavo-convex ribs spaced to form intervening openings, and a sheet of filtering material seated against said ribbed former and arranged to be bent into manifold formation therewith, said sheets and skeleton former being of combustible material.

2. In a filtering unit, a holding frame and a filler therefor including a skeleton former having vertical and horizontally extended concavo-convex ribs spaced to form intervening openings, and a sheet of filtering material seated against said ribbed former, said former and filtering sheet being bent into manifold formation and held in that form by said frame, the convex sides of the adjacent horizontally extended ribs having contact and the vertically extended ribs being spaced for the passage of air therebetween.

3. In a filtering unit, a holding frame and a filler therefor including a latticed former having concavo-convex ribs spaced to form intervening openings, and a sheet of filtering material seated against the edges of the concave sides of the former, said former and filtering sheet being bent into manifold formation and held in that form by said frame with the convex sides of certain of said ribs in contact and with the convex sides of the ribs running in the other direction being spaced to afford air passages therebetween.

4. A filler for air filters involving a forming lattice having concavo-convex intersecting ribs that form large intervening openings, and a sheet of filtering material applied to the concave sides of said ribs, in engagement with the edges and spanning the channels of said ribs, said forming lattice and filtering sheet being bent into manifold formation.

5. The structure defined in claim 4 in which said ribs are provided with air passages spaced from the valley spanning portions of said filtering sheet.

RUSSELL S. WALKER.